United States Patent [19]

Ranney et al.

[11] 4,015,047
[45] Mar. 29, 1977

[54] POLYURETHANE SEALANT AND CAULK SYSTEMS

[75] Inventors: Maurice W. Ranney, Rockland; Robert J. Pickwell, Westchester, both of N.Y.

[73] Assignee: Union Carbide Corporation, New York, N.Y.

[22] Filed: Mar. 27, 1975

[21] Appl. No.: 562,776

[52] U.S. Cl. .......................... 428/425; 427/407 A; 427/407 R; 427/409; 428/429; 428/447
[51] Int. Cl.² ...................... B05D 1/36; B05D 5/10; B32B 27/06; B32B 27/40
[58] Field of Search .......... 427/407 A, 407 R, 409; 156/329, 314, 315; 428/447, 429, 450, 425; 260/448.2 N, 448.8 R

[56] References Cited

UNITED STATES PATENTS

| 3,246,671 | 4/1966 | Stein et al. | 156/329 X |
| 3,309,261 | 3/1967 | Schiller et al. | 428/447 X |
| 3,922,436 | 11/1975 | Bell et al. | 427/407 X |

*Primary Examiner*—James R. Hoffman
*Attorney, Agent, or Firm*—George A. Skoler

[57] ABSTRACT

This invention involves a new class of silane adhesion promoters for the bonding of polyurethane sealants to a variety of substrates. These silane adhesion promoters are mercapto substituted norbornyl containing hydrolyzable silane.

2 Claims, No Drawings

POLYURETHANE SEALANT AND CAULK SYSTEMS

This invention relates to an improvement in the bonding of polyurethane sealants and caulks to inorganic substrates such as glass, metals, metal oxides, mineral, and the like, in other words, the general class of inorganic oxide substrates. More particularly, this invention relates to the use of silane adhesion promoters containing mercaptonorbornyl linkages therein to enhance the bonding of such polyurethanes to such substrates.

There are a number of patents concerned with the bonding of polyurethanes to a variety of inorganic substrates using organo functional silanes as adhesion promoters. For example, U.S. Pat. No. 3,246,671, describes the use of certain amino silanes as adhesion promoting primers for clay pipe junctures to be sealed with urethane polymers. U.S. Pat. No. 3,453,136, utilized a polymeric methacrylate silane as an adhesion promoter for polyurethanes. U.S. Pat. No. 3,779,794, describes the use of a mercaptopropyltrimethoxysilane.

A rather good discussion on the use of silane adhesion promoters (i.e. silane coupling agents) can be found in two articles by Swanson and Price, in "Adhesive Age", on March 1972, at pages 26–32 and June, 1973, at pages 23–28. A range of different silane adhesion promoters are characterized in the 1972 articles and the effectiveness of each is discussed in the bonding of the urethane adhesives. In the conclusion of that articles, Swanson and Price stated that "prepolymer-silane reaction is necessary for high peel strengths after humidity aging." The 1972 article indicates that the prepolymer is a polyurethane polymer containing free isocyanate or hydroxyl or amine groups. The authors considered the aging stability when the silanes were mixed with the prepolymer and from this concluded that certain silanes such as those containing "tertiary amine, epoxy and glycidoxy silanes—resulted in gelation of the isocyanate prepolymer and thus were considered unusable for formulating shelf-stable, two-component adhesive." The amine silanes were found by the authors to "reach an unworkable viscosity at three weeks and gave indication of continuing reaction." Only the mercapto and chloroalkyl substituted silanes were considered "shelf-stable as silane-prepolymer combinations."

One condition which Swanson and Price found critical is the reaction between polyurethane prepolymers and the silane adhesion promoter. This suggests a significant restriction on the utilization of silane adhesion promoters for polyurethane based sealants where the polyurethane is a fully polymerized typically thermoplastic material. Such polyurethanes have found significant utility in the sealant and caulk market. Having a silane adhesion promoter which is effective with this kind of polyurethane would be a most desirable and useful contribution to the art.

Silane adhesion promoters which have been found to be consistently effective as primers for a variety of polymer polyurethanes based compositions are, for example, mercaptopropyltrimethoxysilane, betamercaptoethyltriethoxysilane, gamma-glycidoxypropyltrimethoxysilane, cohydrolyzates of gamma-aminopropyltriethoxysilane and beta-(3,4-epoxycyclohexyl) ethyltrimethoxysilane, and cohydrolyzates of gammamercaptopropyltrimethoxysilane and phenyltriethoxysilane.

There is herein described a process of bonding polyurethane sealants and caulks which optionally possess reactive isocyanate groups to a wide variety of inorganic substrates with a select class of silane adhesion promoters. More particularly, this invention involves providing on the interface between polyurethane sealants or caulks and a solid inorganic substrate a mercapto silane adhesion promoter, or its hydrolyzate and/or condensate, having the following formula:

$$(HS)_b\text{—}R''\text{—}SiX_3$$

wherein $b$ is 1 or 2, X is a hydrolyzable group, $R''$ is one of the polyvalent cycloaliphatic hydrocarbon radicals characterized as follows:

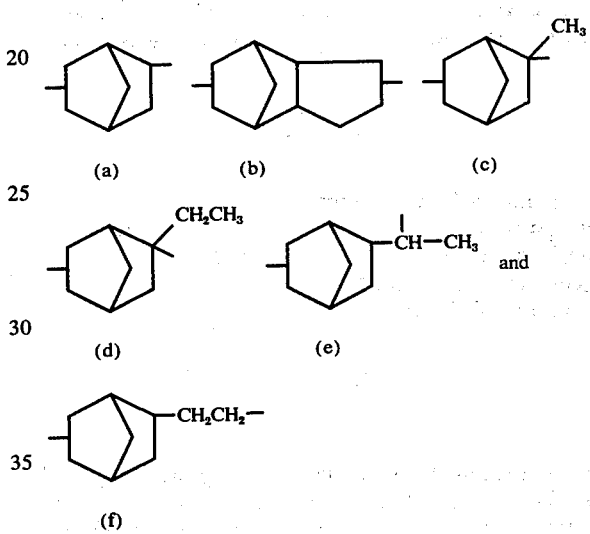

and when $b$ is two, the two mercapto groups are attached to separate carbon atoms and such carbon atoms are adjacent to one another (or vicinal to each other). The result is a bond of the polyurethane sealant or caulk to the inorganic substrate which has greater moisture resistance.

The polyurethane sealants and caulks encompassed by this invention are the conventional polyurethane sealant and caulking compositions known in the art. Polyurethanes may be reactive insofar as they contain free isocyanato groups or they may be wholly thermoplastic reacted polymers essentially free of reactive isocyanate groups. The polyurethanes may be terminated by hydroxyl or amino groups.

The caulks or sealants will typically contain the typical fillers, or, if desired, they may be used free of fillers.

The polyurethane polymers are typically formed by the reaction of an organic polyisocyanate and an organic polyol. Typically an organic diisocyanate is reacted with an organic diol whereby to form a polymer which is either isocyanate endblocked by virtue of using a stoichiometric excess of diisocyanate or it may be hydroxyl terminated by virtue of using a stoichiometric excess of the diol. If the polymer contains free isocyanato group, it is typically called a "prepolymer". It may be further reacted, or chain extended, with another or the same diol or a polyamine.

Polyurethanes are classed as elastomers by virtue of their having limited cross linking by allophanate or biuret linkages, or they are essentially linear and the elastomer qualities are provided by the presence of soft and hard segments in the polymer backbone.

Suitable polyurethanes are the segmented polymers of soft, low-temperature melting hydroxylterminated polymers which have been bonded through urethane linkages to stiff, high-temperature melting urethane, polyamide, polyurea, and/or polyester polymers which have been terminated with isocyanato or groups reactable with polyisocyanates (such as hydroxyl, amino, mercapto, and the like).

The more desirable polyurethanes typically possess at least one, preferably at least two, recurring polyether radical, that is, a polymeric moiety possessrecurring ether linkages i.e., —C—O—C— wherein the carbon atoms adjacent the oxygen are saturated, in the internal chain structure thereof, and/or at least one, preferably at least two, recurring polyester radical, that is, a polymeric moiety possessing recurring ester linkages, i.e.,

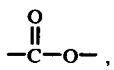

in the internal chain structure thereof. The polyether and polyester radicals preferably possess a molecular weight of at least about 500 and not in excess of about 7,000. They are joined to the remainder of the polymer by urethanyl linkages, i.e.,

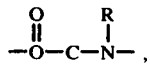

wherein R may be hydrogen or an organic group such as alkyl of from 1 to about 8 carbon atoms, cycloalkyl of from 5 to 8 carbon atoms, phenyl, or benzyl. The urethanyl linkage is bonded to a carbon atom of the organic residue of an organic diisocyanate which in turn is joined through the nitrogen atom of an amide linkage

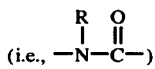

to one of the active hydrogen-free (as determined by the well known Zerewitinoff method) residue of, e.g., an organic diol, a polyamine compound or amino to form a urea linkage

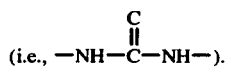

The polyether and polyester radicals as described herein and in the claims may also contain urethanyl linkages of the type described above in the chain thereof. Such radicals desirably have a melting point below 150° C., and preferably below 60° C.

The polyester radical may be formed by the reaction of a dicarboxylic acid with an organic diol or by the condensation polymerization of an alpha-omega-hydroxy-carboxylic acid or an alpha-omega-lactone. Preferably, these polyesters are hydroxyl end-blocked in that the end groups of the polyester are hydroxyl bonded to noncarbonyl containing carbon atoms.

These polyesters are then reacted, if they are of the desired molecular weight, with an organic diisocyanate, most desirably in the ratio of at least 2 moles of diisocyanate to one mole of the polyester, to form a diisocyanato endblock prepolymer. This prepolymer is then reacted with a chain extender such as diol or dithiol chain extenders, diamino chain extenders, or water, to form a substantially linear, solvent-soluble polyurethane. A process for the manufacture of the aforementioned polyurethanes are described in U.S. Pat. No. 3,097,192. Specific illustrations of chain extenders include hydrazine, ethylene diamine, 1,3-propylene diamine, 1,4-butane diamine, 1,6-hexamethylene diamine, 1,4-piperazine, ethylene glycol, 1,2-propylene glycol, 1,4-butane diol, ethanol amine, diethanolamine, urea, dimethylol urea, and the like.

Other suitable polyesters may be formed by the reaction of epsilon caprolactone and/or alkyl-substituted epsilon caprolacetone and an active hydrogen containing initiator such as water, ethylene glycol, ethylene diamine, diethylene glycol, dipropylene glycol, or 1,2-propylene glycol, such as described in U.S. Pat. Nos. 3,169,945; 3,186,971; and 3,427,346.

The polyesters possessing hydroxyl end groups and having a molecular weight in excess of 500 and up to 7,000 may then be reacted with an organic diisocyanate to produce a polyurethane prepolymer having a molecular weight of from about 1,000 up to about 10,000. This polyurethane may be isocyanato endblocked for direct reaction with the chain extender or may be hydroxyl endblocked and is considered a prepolymer for additional reaction with diisocyanate, as described in U.S. Pat. No. 3,186,971.

Another polyurethane which is most suitably employed is that described in U.S. Pat. No. 2,871,218. The polyester-polyurethane of this patent is made by admixing a hydroxyl end-blocked or terminated polyester, formed by the reaction of 1,4-butane diol with adipic acid, with diphenylmethane-p,p'-diisocyanate and 1,4-butane diol in essentially exact stoichiometric proportions. The polyester should have a molecular weight of about 800 to 1,200 and for every mole of polyester this is employed from about 1.1 to 3.1 moles of the diisocyanate and from about 0.1 to 2.1 moles of the butane diol. By increasing the mole amount of diisocyanate, it is possible to increase the melting point and hardness of the resulting polyurethane and by reducing the mole amount of diisocyanate, it is possible to decrease the melting point and hardness of the resulting polyurethane.

The polyethers may be characterized in essentially the same manner as the polyesters above. They fall in the same melting point ranges, are desirably in the same molecular weight range and are hydroxyl endblocked or terminated. They are formed by the alkaline or acid condensation of alkylene oxides. Such polyethers and their utilization in polyurethanes are described in U.S. Pat. Nos. 2,813,776; 2,818,404; 2,929,800; 2,929,803; 2,929,804; 2,948,707; 3,180,853 and RE 24,691.

A particularly desirable method for making linear polyurthanes is described in copending application Ser. No. 084,166, filed Oct. 26, 1970, commonly assigned, now U.S. Pat. No. 3,915,923.

Illustratives of silanes which are covered by this invention are those which are characterized by the following formula:

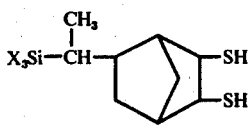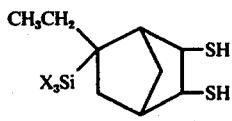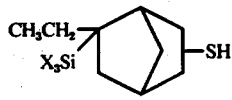

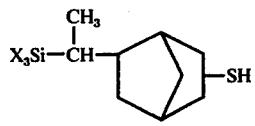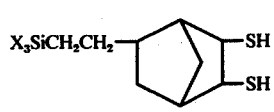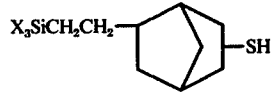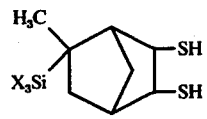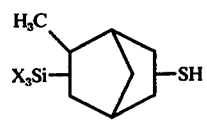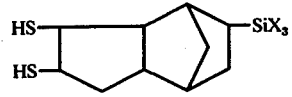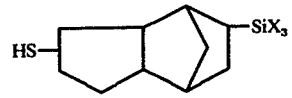

Illustrative of X, that is, the hydrolyzable radicals are chlorine, alkoxy (e.g., methoxy, ethoxy, n-propoxy, isopropoxy, n-butoxy, methoxy- or ethoxyethoxy, beta-chloropropoxy, beta-chloroethoxy, and the like) acetoxy, and the like.

The amount of the silane adhesion promoter which are incorporated into a sealant or caulking formulation, a technique called "integral blending", may range from as little as 0.01 weight % to about 6 weight %, based on the total weight of the composition, preferably from about 1 weight % to about 5 weight % based on the total weight of the sealant or caulking composition.

The amount of silane which is used in priming a substrate before coating the sealant or caulk to the substrate is that amount of silane which is capable of enhancing the adhesion of the caulk or sealant to the substrate. No amount is regarded to be critical. However, one should attempt to avoid putting down too thick a layer of silane to a substrate since this will cause the sealant or caulk to form a weaker adhesion boundary layer where it contacts the substrate or where the silane coating contacts the sealant or caulk. Usually, a solvent solution of the silane is applied to the substrate followed by evaporation of the solvent to leave behind a substrate which is primed with the silane.

It is important to appreciate that the amount of the silane which is used regardless of whether the technique for adhesion promotion is integral blending or priming should be sufficient to enhance the adhesion of the sealant or caulk to the substrate.

It should be recognized that the surface of the substrate should be properly cleaned prior to applying either the primer or the sealant or caulk containing the silane adhesion promoter.

A typical polyurethane formula (Damusis, "Sealants", Reinhold Publ. Corp., N.Y., 1967, page 146) is illustrated by the following:

| Part 1 | Parts by Weight |
|---|---|
| Hydroxyl terminated polyester resin (Multron <sup>TM</sup> R-68, Mobay Chemical Co.,) | 96.2 |
| Methylene dianiline | 1.6 |
| Isocyanate-terminated prepolymer ** | 2.2 |
| TiO$_2$ | 16 |
| Carbon Black | 0.16 |
| Dibutyltindilaurate | 0.16 |
| Molecular Sieve | 2.5 |
| Silane Adhesion Promoter | 1.0 |
| Part 2 ** See Above- | |
| Isocyanate-terminated prepolymer | 10.9 |

-continued (Mondur ™ MR, Mobay Chemical Company, Pittsburgh, Pa.)

Various additives for the control of properties are used which include extender pigments as mica, clay, talc, alumina, slate dust, etc. Other compounding ingredients include dried or calcined pigments, shrinkage minimizing materials such as aluminum powder and zirconium silicate, fire retardants as phosphorous triisocyanate $P(NCO)_3$ or phosphoryl triisocyanate $O=P(NCO)_3$, and bodying agents as organic or inorganic fibers. Naturally, the above silanes are added as adhesion promoters, and the usual antioxidants (Ionol™, Zalba™, etc.) and ultraviolet absorbers Uvionol™400 or Cryosorb™ UV-24) are required in many recipes.

The following is a typical procedure (See Chu et al., U.S. Pat. No. 3,711,445, patent Jan. 16, 1973, at col 4, line 20 et sequence) for making a polyurethane single package sealant system:

Mix in a resin kettle equipped with stirred and distillation head; under inert atmosphere:

A. 53.8 parts of polypropylene ether diol, molecular weight about 3,000 36.0 parts of finely ground $CaCO_3$ 18.2 parts of finely ground $TiO_2$ B. 63.7 parts of polypropylene ether triol, molecular weight about 4,000.

C. 138.0 parts of petroleum naphtha.

After mixing, heat to distill off 50 parts of petroleum naphtha and allow to cool to 70° C.

To the above mixture add:

D. 45.9 parts of bis(4-isocyanatophenyl)methane, and a drop ($\approx.3$ cc.) of stannous octoate catalyst. Stir for 10 minutes. Heat to 100°–105° C. for one hour and cool to room temperature. Add:

E. 67.0 parts of naphthenic and paraffinic process oil blend 37.5 parts of fumed silica, followed by one hour of stirring, to produce a urethane sealant.

Silane coupling agents are preferably added before the isocyanate, if desired. In the above, all parts are parts by weight.

The following methods were used for cleaning the test panels used in the experiments below:

1. The aluminum panels were degreased with methylethylketone solvent and allowed to dry.

2. Each aluminum panel was thoroughly rubbed with 00 grade steel wool, to remove the oxide layer and were washed with a water solution of an Alconox™ laboratory detergent abrasive cleaner until it was completely wetted by a film of water which after draining, left a film of water on the surface.

3. The panels were rinsed in distilled water, blotted with paper towels and allowed to dry in a horizontal position at room temperature for several hours.

Similarly, glass test panels were cleaned as follows:

1. The glass was scrubbed with Ajax™ cleanser on a cloth pad until dipping in water and draining showed a flow-off of the water as a film rather than droplets.

2. The panels were rinsed in distilled water, blotted with clean paper toweling, and allowed to dry in a horizontal position at room temperature in a 50% relative humidity atmosphere for several hours.

These preparation procedures exceed the requirements of Federal Specification TT-S000227E for sealing compounds.

The method employed for the testing and evaluation of all silane compounds in this example is described below:

The silane primer materials were 5 weight% solution of the silane adhesion promoters cited below in a 90/10 mixture by weight of SD-3A (denatured) ethanol/water. They were applied to suitably cleaned and dried (as described above) glass and aluminum panels as test substrates, allowing several hours to dry at room temperature.

The silane primer solutions were applied on the panels by brushing with a clean camels hair brush which had been dipped into the primer solution and lightly drained by touching the rim of the storage bottle container. The primed panels were then placed flat on a benchtop and allowed to dry for 3 or 4 hours at room temperature.

Two commercially available urethane sealant compositions were used in these evaluations. They were single-package, cartridge type sealants, obtained directly from the manufacturer. Two different colors of sealant, white and tan, were used. The sealant was applied to the test panels as beads of sealant extruded from the standard hand-held type caulking gun to provide uniform, smooth, ⅜ inch diameter beads of material running the full length of the 6 inch long test panels.

The sealant was allowed to dry overnight at room temperature at about 50% relative humidity, followed by three weeks exposure to 100% relative humidity at room temperature ($\approx 20-25°$ C.). The adhesion was examined after this initial three-week cure, then the test panels were immersed in tap water and tested after 7 days immersion, and again after 30 days immersion in the tap water at room temperature.

The adhesion of the cured sealant beads to the test panels was measured by partially stripping the cured sealant from the substrate and noting whether failure was adhesive at the substrate surface, indicating poor adhesion, or cohesive within the sealant, indicating the bond to the substrate was desirably stronger than the cohesive forces within the cured sealant.

EXPERIMENTAL

Aluminum and glass test panels were primed with the 5% solutions of the silanes listed below, and allowed to dry for several hours. Beads of white and tan commercial polyurethane-based sealant were applied to the primed panels. After curing three weeks at room temperature, 100% relative humidity, there were no signs of adhesive failure, only cohesive failure. Similarly, after one week and four weeks and six months water immersion periods, the peel tests showed only cohesive failure indicating excellent adhesion of the sealant to the primed test panels.

The same commercially available sealants similarly applied to cleaned unprimed glass and aluminum substrates (test panels) showed complete adhesive failure in that the sealant beads were easily stripped from the unprimed glass and aluminum surfaces.

SILANES TESTED

Example
1. 2 (or 3) mercapto-5-methoxysilyl bicyclo(2,2,1) heptane
2. 2 (or 3) mercapto-5-trimethoxysilylethylbicyclo-(2,2,1) heptane.

What is claimed is:

1. The process for enhancing the bonding of polyurethane sealant or caulks to solid inorganic substrates which comprises providing at the interface of the substrate and the sealant or caulk a silane or its hydrolyzate or condensate of the formula $$(HS)_b-R''-Six_3$$

in which $b$ is 1 or 2, X is a hydrolyzable group comprised of chlorine, alkoxy or acetoxy radicals, R'' is one of the polyvalent cycloaliphatic hydrocarbon radicals of the formula and when $b$ is two, the two mercapto groups are attached to separate carbon atoms and such carbon atoms are adjacent to one another.

2. The product of the process of claim 1.

* * * * *